United States Patent [19]

Loyvet et al.

[11] Patent Number: 4,461,720
[45] Date of Patent: Jul. 24, 1984

[54] FIRE-RETARDANT TREATMENT COMPOSITION

[75] Inventors: Andre G. Loyvet; Dennis J. Morgan, both of Roseburg, Oreg.

[73] Assignee: Hoover Treated Wood Products, Inc., Thompson, Ga.

[21] Appl. No.: 381,582

[22] Filed: May 24, 1982

[51] Int. Cl.$^3$ ............................................... C09K 3/28
[52] U.S. Cl. .................... 252/607; 106/15.05; 427/393; 524/843; 528/242
[58] Field of Search ............... 252/607, 601, 602, 603, 252/606, 604; 8/116 P; 106/15.05; 427/393; 524/843; 528/242

[56] References Cited

U.S. PATENT DOCUMENTS

| | | | |
|---|---|---|---|
| 2,917,408 | 12/1959 | Goldstein et al. | 117/103 |
| 3,159,503 | 12/1964 | Goldstein et al. | 117/317 |
| 3,832,316 | 8/1974 | Juneja | 260/29.4 R |
| 3,887,511 | 6/1975 | Juneja | 260/29.4 R |
| 3,925,137 | 12/1975 | Kamai | 252/607 |
| 3,986,881 | 10/1976 | Oberley | 252/607 |
| 4,010,296 | 3/1977 | Oberley | 427/393 |
| 4,123,575 | 10/1978 | Wesch | 427/386 |
| 4,254,177 | 3/1981 | Fulmer | 428/256 |
| 4,273,687 | 6/1981 | Cummins et al. | 252/607 |

FOREIGN PATENT DOCUMENTS

| | | | |
|---|---|---|---|
| 48-23399 | 7/1973 | Japan | 252/601 |
| 49-21560 | 6/1974 | Japan | 252/607 |
| 51-58598 | 5/1976 | Japan | 252/607 |
| 53-73898 | 6/1978 | Japan | 252/601 |
| 54-70698 | 6/1979 | Japan | 252/607 |

*Primary Examiner*—Benjamin R. Padgett
*Assistant Examiner*—Howard J. Locker
*Attorney, Agent, or Firm*—Kolisch, Hartwell, Dickinson & Anderson

[57] ABSTRACT

A composition for treating wood to impart fire retardance prepared by converting dicyandiamide to an aqueous guanyl urea solution, methylolating the guanyl urea and introducing phosphoric acid to produce a phosphate salt of the methylolated guanyl urea.

5 Claims, No Drawings

Explaining the present invention in greater detail, guanyl urea may be conveniently prepared from dicyandiamide by dissolving dicyandiamide in water, adjusting the pH of the resultant mixture to below about 4, and preferably within the range of 2 to 3, and heating the resultant mixture at a temperature above about 85° C., and preferably at a temperature ranging from 90° to 100° C., for a period of approximately 30 minutes. One mole of dicyandiamide reacts with 1 mole of water to produce guanyl urea, and the conversion of the dicyandiamide to guanyl urea under these conditions is quantitative and irreversible. At the conclusion of the reaction, the pH of the result solution is only slightly on the acidic side, i.e., within the range of 5.5 to 6.5.

Because of solubility problems, the initial mixture of dicyandiamide and water which is prepared preferably has a concentration of dicyandiamide, on a weight basis, of about 50% or less. Although the conversion of dicyandiamide to guanyl urea will occur with relatively dilute solutions of dicyandiamide, normally solutions of less than about 30% dicyandiamide are not utilized, since this needlessly increases the volume of the mixture being handled, requiring the use of larger reactor vessels, introducing heating and cooling problems, etc.

The pH of the initial reaction mixture may be adjusted to the level indicated by the addition of phosphoric acid, or other conventional acids such as hydrochloric and sulfuric acids. Only a relatively small amount of acid is required to produce the pH adjustment. Thus, for example, for a reaction mixture containing 500 lbs. of dicyandiamide, typically only about 10 to 15 lbs. of phosphoric acid are required.

Guanyl urea may be methylolated to obtain essentially monomethylol guanyl urea by introducing formaldehyde to the guanyl urea solution prepared as above indicated. In the acid medium employed, monomethylol guanyl urea is essentially the only methylolated product obtained. Ordinarily, the usual 37% aqueous solution of formaldehyde may be used. Methylolation of a typical guanyl urea formaldehyde mixture to produce the guanyl urea methylolated product will occur over a period of about an hour, with the temperature of the mixture maintained within the range of about 70°–80° C.

After methylolation of the guanyl urea, melamine is introduced to the reaction mixture. The mole ratio of guanyl urea to melamine employed as reactants in making the treatment solution is within the range of 5:1 to 10:1. The mixture is cooled preferably before adding the melamine, to a temperature within the range of 50°–60° C. The mixture is maintained preferably at this temperature until the melamine has dissolved, and the mixture then preferably is cooled to about 30° C. preparatory to the introduction of phosphoric acid.

The amount of formaldehyde introduced as a reactant to the reaction mixture produces a mole ratio of formaldehyde to combine to guanyl urea and melamine within the range of from 1:1 to 2:1. With methylolation of the guanyl urea using an amount of formaldehyde falling within a lower point of the indicated range, the amount of free formaldenyde remaining in the methylolation mixture prior to the introduction of the melamine is not substantial, but is sufficient to convert the melamine when such is added to a monomethylolated product, whereby it dissolves. With an increase in the mole ratio of formaldehyde to combine guanyl urea and melamine, more reactive mixtures are produced. With higher mole ratios, a greater amount of free formaldehyde remains in the reaction mixture prior to the introduction of the melamine. Optimum results are obtained, in terms of obtaining final solutions with good storage life and suitable reactivity, with mole ratios ranging from about 1.2 to 1.7:1.

A methylolated mixture of guanyl urea and melamine may alternatively be prepared by initially methylolating the guanyl urea utilizing a portion of the total formaldehyde to be employed, and using the remainder of the formaldehyde in the methylolating of the melamine in a separate vessel, with the methylolated products then combined. Ordinarily, no advantages are obtained by this procedure, however, Methylolation of the guanyl urea is performed before addition of the melamine by reason of the fact that melamine is the more reactive of the two materials, and it is desirable to obtain substantial monomethylolation of the guanyl urea before introduction of the melamine.

After preparation of the mixture of methylolated guanyl urea is produced by adding phosphoric acid to the mixture. The amount of phosphoric acid employed is within the range of from 1 to 1.5, preferably 1 to 1.4 moles of phosphoric acid per mole of amine compound in the reaction mixture, i.e., per combined moles of guanyl urea and melamine utilized in preparing the methylolated guanyl urea and melamine mixture. With the addition of phosphoric acid, and because of the characteristic of the strong base which methylolated guanyl urea possesses, a substantially quantitative reaction occurs with the production of a methylolated guanyl urea phosphate salt.

Mixtures resulting may be diluted with additional water at this time or at a later time to produce solutions used in the treatment of wood for fireproofing purposes. Commonly, wood treatment solutions are prepared having active solid concentrations ranging from about 10 to 30%. The term "active solid" refers to the nonvolatilized remainder of a sample dried at 105° C. or 3 hours.

EXAMPLE I 420 lbs. of dicyandiamide, 500 lbs. of water, and 10 lbs. of phosphoric acid solution (85% phosphoric acid) were introduced into a reaction vessel equipped with heating and cooling means, and an agitator. The initial pH of the mixture was approximately 2.5. The contents of the vessel were heated to a temperature of 95° C. and this temperature maintained for a period of about ½ hour. The solution resulting had a pH of 6.

To this solution, 730 lbs. of formaldehyde solution (37% formaldehyde) were added. This caused the temperature of the contents of the vessel to drop to about 70° C., and this temperature was maintained for a period of 1 hour. The contents of the vessel were then cooled to 60° C. and 126 lbs. of melamine added with agitation, until the melamine dissolved, the solution within the vessel becomeing clear. The mixture was then cooled to about 30° C., and 830 lbs. of phosphoric acid solution introduced slowly while maintaining the temperature below 35° C.

Additional water was introduced to the resulting mixture to produce an active solid content of 30%. The resulting treatment solution exhibited a storage life without refrigeration in excess of 60 days.

EXAMPLE II

In another preparation, 756 lbs. of dicyandiamide, 900 lbs. of water, and 18 lbs. of phosphoric acid solution were introduced into the reaction vessel. After subse-

FIRE-RETARDANT TREATMENT COMPOSITION

BACKGROUND AND SUMMARY

This invention relates to wood treatment compositions for imparting fire retardance to wood treated therewith. More particularly, the invention concerns fire-retardant wood treatment compositions which are partially reacted resin solutions based on melamine, formaldehyde and an oxyacid of phosphorous, i.e., phosphoric acid.

In recent years, a number of fire-retardant wood treatment compositions have been proposed based on amine and phosphorous compounds, and many of them amine-aldehyde-phosphorous condensation compounds. A common practice is to impregnate the wood with a solution of an incompletely reacted amine-aldehyde composition together with an oxyacid of phosphorous. After impregnation, the wood is dried and cured.

Illustrative of various prior art approaches are the treatment solutions disclosed in Goldstein et al, U.S. Pat. No. 2,917,408 prepared from a combination of dicyandiamide and phosphoric acid, and Goldstein et al, U.S. Pat. No. 3,159,503 prepared from a combination of dicyandiamide, phosphoric acid, and formaldehyde. In Juneja, U.S. Pat. No. 3,887,511, fire-retardant formulations are disclosed comprising a partially reacted mixture of urea, dicyandiamide, formaldehyde and phosphoric acid.

The prior art has recognized that in order to obtain better leach resistance, formulations may be prepared using melamine instead of urea. Thus, Juneja, in U.S. Pat. No. 3,832,316, discloses a fire-retardant composition comprising a partially reacted mixture of dicyandiamide, formaldehyde, melamine and phosphoric acid. A typical treatment formulation is prepared according to the disclosure of this patent by methylolating melamine and dicyandiamide by slowly mixing such with a formaldehyde solution adjusted to an alkaline pH. By performing the methylolation in an alkaline medium, condensation of the intredients is inhibited. Alkalinity in the formaldehyde solution is produced by the introduction of sodium hydroxide. After methylolation, the reaction mixture is cooled and phosphoric acid introduced slowly to produce the final intermediate stage resin solution. A treatment solution so produced has only limited storage life and commonly must be refrigerated to extend its storage life.

In Oberley, U.S. Pat. No. 4,010,296, a treatment composition is disclosed wherein a partially reacted mixture of monomethylol dicyandiamide, formaldehyde, and melamine is first prepared. This solution is then cooled to prepare it for shipment. Phosphoric acid may then be added to produce a final composition for wood treatment. While the mixture without phosphoric acid may have a limited degree of stability, as soon as phosphoric acid is added, storage life is sharply reduced unless refrigeration is employed.

Generally speaking, where melamine is utilized instead of urea, and because of the greater reactivity of melamine, storage life becomes a problem. To decrease the concentration of melamine in the composition so as to enhance storage life tends to decrease the leach resistance of the final composition when applied and cured on treated products. Further, to produce alkalinity in a solution by the addition of a material such as sodium hydroxide has disadvantages, since this introduces sodium ions into the final resin and thus solubility sites in the final resin.

Bottoming the instant invention is the appreciation that dicyandiamide may be advantageously employed in fire-retardant wood treatment solutions if such is converted to a derivative form exhibiting the characteristics of a strong base. In such derivative form, and upon the introduction of phosphoric acid to the treatment solution, a phosphate salt of the dicyandiamide derivative is produced effective to retard the mobility of phosphate ions in the solution. As a consequence, far greater storage life is obtained in the final treatment solution, even in a solution containing an appreciable amount of melamine. The solutions contemplated, nevertheless, are curable in a conventional manner, after being applied to a wooden article, to produce a treated product having excellent leach resistance, fire retardance, minimal hydroscopicity, and excellent resistance to blooming.

More specifically, and describing the preparation of compositions as contemplated, a solution may be prepared of dicyandiamide and water, with the initial pH of the solution adjusted to below 4, and preferably 3. On such being heated, and over a period of time, the dicyandiamide substantially quantitatively reacts with water to produce guanyl urea having the following structural formula:

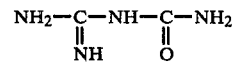

Guanyl urea, as well as methylolated guanyl urea, exhibits the characteristics of a strong base, and forms a phosphate salt on the addition of phosphoric acid to a solution containing the compound. As a consequence, treatment solutions comprising partially reacted product of methylolated guanyl urea, methylolated melamine and phosphoric acid exhibit prolonged storage lives, for example, up to six months under normal temperature conditions. Nevertheless, they are readily cured after application to a wood product to produce an insoluble resin with excellent fire-retardant characteristics.

Thus, a general object of the invention is to provide improved fire-retardant wood treatment solutions or compositions which are incompletely reacted amine-aldehyde compositions including an oxyacid of phosphorous.

It is a further object of the invention to provide a treatment composition for wood, to impart fire resistance thereto based on a derivative of dicyandiamide, melamine, formaldehyde and phosphoric acid, exhibiting an enhanced storage life.

A further object is to provide a wood treatment composition for imparting fire retardance to treated wood prepared by converting dicyandiamide in the presence of water and at an acid pH into guanyl urea, methylolating the guanyl urea and incorporating melamine with the methylolated guanyl urea, and thence incorporating with the mixture produced, phosphoric acid, to produce a partial reaction product suitable for the treatment of wood.

These and other objects and advantages are attained by the invention, which will become more fully apparent from the following description, taken in conjunction with specific examples included for the purpose of illustration only.

quent raising of the temperature of the contents of the vessel to 95° C. and heating for ½ hour, 1,216 lbs. of formaldehyde solution were introduced. With maintaining of the temperature of the contents of the vessel at 70° C. and after 1 hour, the mixture was cooled to 60° C., and 126 lbs. of melamine introduced. The mixture was then processed as in Example I, except that the phosphoric acid solution addition was in the amount of 1,384 lbs. The treatment solution produced had a storage life without refrigeration in excess of 180 days.

EXAMPLE III

A series of Douglas firs specimens approximately 3"33 ½"×½" in size were treated with various fire-retardant compositions including the fire-retardant composition of Example I. The impregnation treatment employed was the full cell method of impregnation, wherein the specimens are immersed in the treatment solution and subjected to a cycle of 30 minutes under a vacuum of 20" of mercury, followed by a cycle of 1 hour at a pressure of 120 psi. Specimens so treated were then cured by drying them for 40 hours at a temperature of about 60° C., followed by 24 hours at a temperature of about 105° C. The treated and cured samples were then ground in a Wiley mill to about 20 mesh. A 10 gram sample of the ground material was then placed in 250 grams of water and agitated for 1½ hours. The water was then filtered from the sample, and the process repeated 3 times, to produce a leached sample. The leached sample and an unleached sample were then analyzed for phosphorous, to determine the leach resistance of the composition used in treating and curing the wood. The following table sets forth the leach resistance, on a relative scale of from 1 to 10, of various compositions employed in the treatment and curing of the wood material.

TABLE 1

| Treatment | Relative Value |
| --- | --- |
| Composition as set forth in Canadian Patent 917,334 | 4.5 |
| Composition as set forth in U.S. Pat. No. 4,010,296 | 9.5 |
| Composition as set forth in U.S. Pat. No. 3,832,316 | 8 |
| Composition of Example I | 10.0 |

EXAMPLE IV

Douglas fir sticks ½"×½"×6' were treated with the fire-retardant composition of Example I using the full cell method wherein the sticks are first immersed in the solution and subjected to 30 minutes of vacuum at 20" of mercury followed by 1½ hours at a pressure of 100 psi. The wood sticks so treated were then cured by air-drying for 48 hours at room temperature, followed by 48 hours at 50° C. and 24 hours at 90° C. The treated and cured wood sticks were then evaluated for fire-retardant properties, employing the so-called crib test set forth in ASTM-E 160-50. In the table below, the percent weight loss observed in 4 different test runs is set forth. Test runs 1, 2 and 3 utilize different samples of wood sticks treated and cured as set forth above, and test run 4 utilized untreated wood.

TABLE 2

| Test Run | Percent Weight Loss |
| --- | --- |
| 1 | 14.7 |
| 2 | 17.3 |
| 3 | 20.6 |
| 4 | 85 |

While particular embodiments of the invention have been set forth, it should be obvious that variations and modifications are possible without departing from the invention.

It is claimed and desired to secure by letters patent:

1. A fire-retardant composition prepared by
   reacting dicyandiamide with water under acidic conditions to convert the dicyandiamide to an aqueous guanyl urea solution,
   adding formaldehyde and melamine to the guanyl urea solution to produce a solution of methylolated guanyl urea and melamine, said solution containing a mole ratio of guanyl urea to melamine in the range of from 5:1 to 10:1, and
   introducing phosphoric acid to said methylolated guanyl urea and melamine solution with such reacting with the methylolated guanyl urea to produce a phosphate salt thereof.

2. The fire-retardant composition of claim 1, wherein the methylolated guanyl urea and melamine solution is prepared by initially introducing formaldehyde to the guanyl urea solution and the mixture reacted to produce methylolated guanyl urea, and melamine is then introduced with dissolving of the melamine in the solution to produce the methylolated guanyl urea and melamine solution, the formaldehyde introduced being in an amount producing a mole ratio of formaldehyde to combined guanyl urea and melamine of from 1:1 to 2:1.

3. An aqueous wood treatment solution for imparting fire-retardant properties to wood treated therewith, and the solution exhibiting enhanced storage life characteristics, the solution comprising an aqueous solution of essentially monomethylol guanyl urea phosphate salt and methylolated melamine, the mole ratio of guanyl urea to melamine in the solution being in the range of from 5:1 to 10:1.

4. The treatment solution of claim 3, perpared by the steps of making methylolated guanyl urea by the reaction of a mixture of guanyl urea solution with aqueous formaldehyde, the pH of the mixture being within the range of 5.5 to 6.5, and then introducing the melamine to the reaction mixture with dissolving of the melamine, and subsequently reacting the mixture with phosphoric acid to produce the phosphate salt.

5. An intermediate stage resin solution useful in imparting fire-retardance to treated objects formed by reacting dicyandiamide with water at an initial pH of no more than about 4 to convert the dicyandiamide to a guanyl urea solution, methylolating the guanyl urea so produced by reacting the guanyl urea solution with aqueous formaldehyde introduced into the solution, introducing melamine to the resulting methylolated guanyl urea solution, the melamine introduced producing a mole ratio of guanyl urea to melamine in the range of from 5:1 to 10:1, and introducing phosphoric acid into the resulting solution in an amount to produce a mole ratio of phosphoric acid to combined guanyl urea and melamine within the range of about 1:1 to 1:1.5, the formaldehyde introduced being in an amount producing a mole ratio of formaldehyde to combined guanyl urea and melamine of from 1:1 to 2:1.

* * * * *